US009820014B1

(12) United States Patent
Kessenger et al.

(10) Patent No.: US 9,820,014 B1
(45) Date of Patent: *Nov. 14, 2017

(54) LOCATION-BASED MOVIE IDENTIFICATION SYSTEMS AND METHODS

(71) Applicant: West Corporation, Omaha, NE (US)

(72) Inventors: Erika Nelson Kessenger, Denver, CO (US); Bruce Pollock, Omaha, NE (US)

(73) Assignee: West Corporation, Omaha, NE (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/051,136

(22) Filed: Feb. 23, 2016

Related U.S. Application Data

(63) Continuation of application No. 14/606,187, filed on Jan. 27, 2015, now Pat. No. 9,271,036, which is a
(Continued)

(51) Int. Cl.
*H04N 21/84* (2011.01)
*H04N 21/4223* (2011.01)
(Continued)

(52) U.S. Cl.
CPC ......... *H04N 21/84* (2013.01); *H04N 5/44543* (2013.01); *H04N 21/2543* (2013.01); *H04N 21/40* (2013.01); *H04N 21/414* (2013.01); *H04N 21/4126* (2013.01); *H04N 21/41407* (2013.01); *H04N 21/4223* (2013.01); *H04N 21/44008* (2013.01); *H04N 21/4524* (2013.01); *H04N 21/478* (2013.01); *H04N 21/47815* (2013.01); *H04N 21/482* (2013.01); *H04N 21/4828* (2013.01); *H04N 21/6581* (2013.01); *H04N 21/6582* (2013.01); *H04N 21/8153* (2013.01)

(58) Field of Classification Search
None
See application file for complete search history.

(56) References Cited

U.S. PATENT DOCUMENTS

2007/0286463 A1\* 12/2007 Ritzau .................... G06K 9/228
382/118
2008/0271072 A1\* 10/2008 Rothschild ............. H04H 60/50
725/35

(Continued)

*Primary Examiner* — Justin Shepard
(74) *Attorney, Agent, or Firm* — Raffi Gostanian

(57) ABSTRACT

The illustrative embodiments described herein provide systems and methods for movie identification based on a location. In the embodiment, a method includes locating a mobile communication device associated with a user to form location data, accessing a location database to determine a geographic location of the mobile communication device based on the location data, and identifying a set of movies related to the geographic location by accessing a movie database. Each of the set of movies in the movie database is associated with one or more respective geographic locations. The method also includes presenting a set of movie results corresponding to the set of movies on a graphical user interface of the mobile communication device. In another embodiment, the method may also validate an object photographed by a camera of the mobile communication device, and use the recognized object to identify the set of movies.

15 Claims, 9 Drawing Sheets

Related U.S. Application Data continuation of application No. 14/095,646, filed on Dec. 3, 2013, now Pat. No. 8,955,011, which is a continuation of application No. 12/856,906, filed on Aug. 16, 2010, now Pat. No. 8,627,358.

(51) Int. Cl.

| | | |
|---|---|---|
| *H04N 21/482* | (2011.01) | |
| *H04N 21/658* | (2011.01) | |
| *H04N 21/44* | (2011.01) | |
| *H04N 21/45* | (2011.01) | |
| *H04N 21/2543* | (2011.01) | |
| *H04N 21/41* | (2011.01) | |
| *H04N 5/445* | (2011.01) | |
| *H04N 21/478* | (2011.01) | |
| *H04N 21/81* | (2011.01) | |
| *H04N 21/40* | (2011.01) | |
| *H04N 21/414* | (2011.01) | |

(56) References Cited

U.S. PATENT DOCUMENTS

| | | | |
|---|---|---|---|
| 2009/0112815 A1* | 4/2009 | Antognini | G06F 17/30873 |
| 2009/0320070 A1* | 12/2009 | Inoguchi | H04N 7/163 |
| | | | 725/40 |
| 2010/0161756 A1* | 6/2010 | Lewis | H04N 7/17318 |
| | | | 709/217 |
| 2011/0255738 A1* | 10/2011 | Gao | G06K 9/228 |
| | | | 382/103 |

* cited by examiner

LOCATION-BASED MOVIE IDENTIFICATION SYSTEMS AND METHODS

CROSS-REFERENCE TO RELATED APPLICATIONS

This application is a continuation from U.S. patent application Ser. No. 14/606,187, filed Oct. 14, 2015, and entitled "LOCATION-BASED MOVIE IDENTIFICATION SYSTEMS AND METHODS", which is a continuation from patent application Ser. No. 14/095,646, filed Dec. 3, 2013, and entitled "LOCATION-BASED MOVIE IDENTIFICATION SYSTEMS AND METHODS", now issued U.S. Pat. No. 8,955,011, which is a continuation from patent application Ser. No. 12/856,906, filed Aug. 16, 2010, and entitled "LOCATION-BASED MOVIE IDENTIFICATION SYSTEMS AND METHODS", now issued U.S. Pat. No. 8,627,358, each of which is incorporated by reference herein in their entirety.

BACKGROUND

1. Field of the Invention

The present invention relates generally to systems and methods for identifying movies. More particularly, the present invention relates to identifying movies at least partially based on a location of a user.

2. Description of the Related Art

The ever-increasing catalog of movies can present challenges for viewers in selecting a movie according to his or her preferences. While movies can often be found or identified according to static criteria, such as title, genre, actor, or actress, current systems or applications may not allow viewers to select a movie based on some types of criteria. For example, current systems are limited in that they may not allow people to find movies that contain, or otherwise relate, to the current location of a device, such as a cellular phone, used by that person. Current systems may also be unable to identify and deliver a listing of movies to a viewer based on a picture captured by the viewer's cellular phone camera. The failure of current systems to conveniently identify movies based on a location may lead moviegoers with no way to find movies for potential viewing based on located-related criteria.

SUMMARY

The illustrative embodiments described herein are directed to a data processing system and, in particular, to systems and methods for movie identification based on a location. In the embodiment, a method includes locating a mobile communication device associated with a user to form location data, accessing a location database to determine a geographic location of the mobile communication device based on the location data, and identifying a set of movies related to the geographic location by accessing a movie database. Each of the set of movies in the movie database is associated with one or more respective geographic locations. The method also includes presenting a set of movie results corresponding to the set of movies on a graphical user interface of the mobile communication device.

In another embodiment, a method includes receiving an image captured by a camera of a mobile communication device. The mobile communication device is associated with a user, and the image at least partially contains an object. The method includes identifying the object contained in the image and accessing a movie database to identify a set of movies associated with the object. The movie database includes a plurality of movies associated with a respective set of objects. The method includes presenting a set of movie results corresponding to the set of movies on a graphical user interface of the mobile communication device.

In another embodiment, a location-based movie identification system includes a movie identification application at least partially implemented by a mobile communication device. The movie identification application includes a location identification module to determine a geographic location of the mobile communication device, and a movie identification engine to identify a set of movies associated with the geographic location. The movie identification engine includes a movie results module to initiate a movie results interface on a graphical user interface of the mobile communication device. The movie results interface lists a set of movie results corresponding to the set of movies.

DETAILED DESCRIPTION

Figure 1:
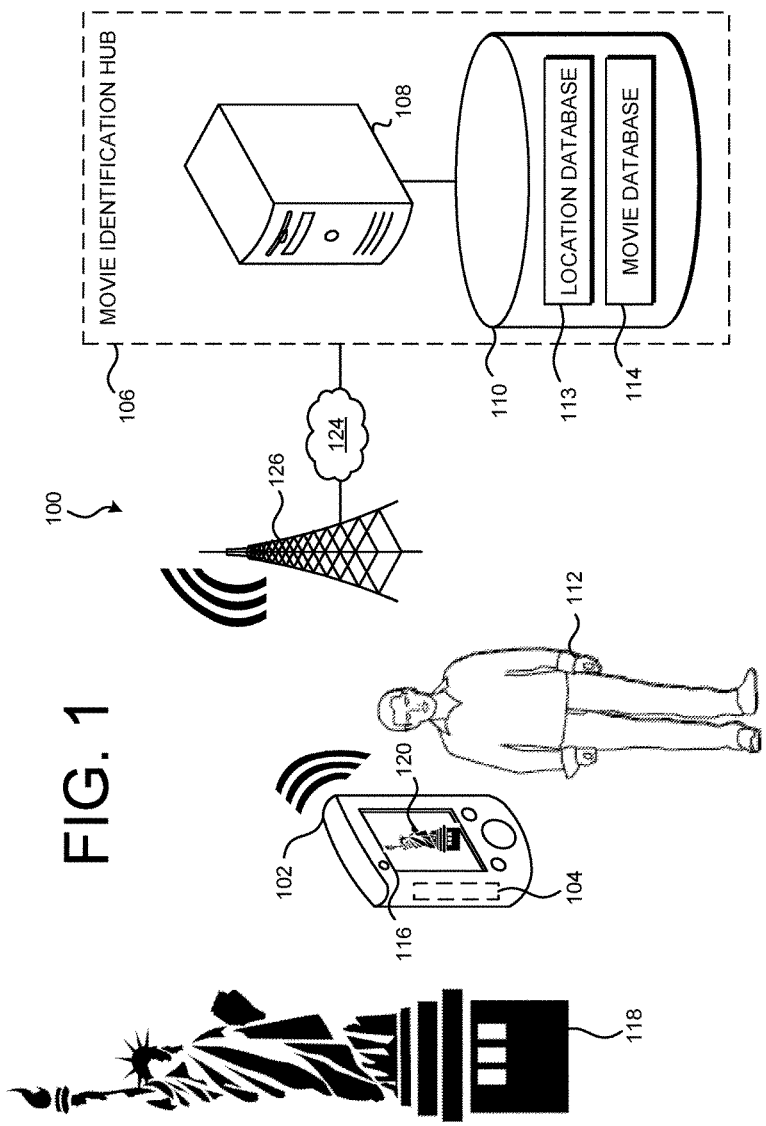
FIG. 1 is a schematic, pictorial representation of a location-based movie identification system according to an illustrative embodiment.

Referring to FIG. 1, an illustrative embodiment of a location-based movie identification system 100 includes a mobile communication device 102 on which a movie identification application 104 is implemented. The mobile communication device 102 is in communication with a movie identification hub 106, which includes a server 108. The movie identification hub 106 may also include a storage device 110 on which data supporting the functionality of the movie identification application 104 may be stored. The storage device 110, though shown at the movie identification hub 106, may also be located in the mobile communication device 102. A user 112 of the mobile communication device 102 may interface with the movie identification application 104 to retrieve or view a set of movies that relate to the current location of the user 112. Unless otherwise indicated, as used herein, "or" does not require mutual exclusivity. As used herein, the term "set" encompasses a quantity of one or more.

In one embodiment, the location-based movie identification system 100 locates the mobile communication device 102, and identifies location data that indicates the mobile communication device's location. For example, the movie identification application 104 may have, or communicate with, a global positioning system or other similar location technology (e.g., WiFi, cell identification (Cell ID), observed time difference of arrival (OTDOA), enhanced observed time difference (E-OTD), network multipath analysis and assisted global positioning system (A-GPS), etc.) to determine the global positioning system coordinates that reflect the location of the mobile communication device 102. Using the location data, the movie identification application 104 may access the storage device 110 to determine the geographic location of the mobile communication device 102. The storage device 110 may include a location database 113 that includes many different locations around the world that are indexed with any type of location data, such as global positioning system coordinates. By way of specific illustration, the movie identification application 104, after determining the global positioning system coordinates of the mobile communication device 102, may use these coordinates when accessing the location database 113 to search for and identify the geographic location of the mobile communication device 102 as being at or near Liberty Island, New York, N.Y. 10004. In this specific example, the global positioning system coordinates indicate that the mobile communication device 102 is located on Liberty Island.

Once the geographic location of the mobile communication device 102 is determined, the movie identification application 104 may access a movie database 114 in the storage device 110. The movie database 114 may include any number of movies, as well as data about those movies. In one embodiment, each movie in the movie database 114 is associated with one or more geographic locations that relate to the respective movie. For example, movies that contain, have dialogue about, or otherwise relate to Liberty Island or New York City may be associated with these geographic locations, such as in the form of geotags or other metadata. Using the geographic locations that are associated with the movies in the movie database 114, the movie identification application 104 may search for and identify the movies in the movie database 114 that are associated with the geographic location of the mobile communication device 102. The movies that are identified may then be presented as search results, or in any other form, to the user 112 of the mobile communication device 102 by displaying the movie search results on the graphical user interface 116 of the mobile communication device 102.

Another embodiment of the location-based movie identification system 100 utilizes a camera on the mobile communication device 102 in order to identify the movies relating to an object 118 in an image 120 captured by the camera. In this embodiment, the movie identification application 104 may receive the image 120 that is captured by the camera. The movie identification application 104 may then identify the object 118 that is at least partially contained in the image 120. Recognition of the object 118 that is contained in the image 120 may be performed using any of a variety of techniques, such as image analysis or other methods described in further detail below. The movie identification application 104 may then access the movie database 114 to identify movies that are associated with the object 118 contained in the image 120. The movies in the movie database 114 may each be tagged, or otherwise associated with, one or more objects that relate to the movie. For example, objects that appear in, relate to the plot of, are talked about in, or otherwise relate to a movie in the movie database 114 may be associated with that movie. In identifying the movies that are associated with the object 118, the movie identification application 104 may search for and identify the object 118 in the movie database 114, and then identify the movies that are associated with that object 118. The movies that are identified by the movie identification application 104 may then be presented on the graphical user interface 116 of the mobile communication device 102 so that they can be viewed by the user 112. As explained in further detail below, the user 112 may be presented with an option to purchase or view any of the movies that are listed on the graphical user interface 116 by the movie identification application 104.

While FIG. 1 shows the movie identification application 104 to be located or implemented in the mobile communication device 102, the movie identification application 104 may also be implemented elsewhere, such as on the server 108. In another embodiment, the movie identification hub 106, including the storage device 102 containing the location database 113 and the movie database 114, may be located or implemented in the mobile communication device 102 along with the movie identification application 104. Indeed, the movie identification application 104 and movie identification hub 106, including any combination of functionality thereof, may be distributed across the location-based movie identification system 100 in a variety of ways.

The mobile communication device 102 may be any device capable of communicating with other devices and interfacing with the user 112. For example, the mobile communication device 102 may be a cellular phone (e.g., a smart phone), a walkie talkie, a computer (e.g., a laptop, netbook, tablet computer, or minicomputer), a personal digital assistant, a digital music player, a digital reader, a portable gaming device, a web browsing device, a media player, or any other electronic device that is mobile and capable of communicating data with other devices.

The techniques, technologies, or media by which the components of the location-based movie identification system 100 intercommunicate are numerous. For example, the location-based movie identification system 100, or any portion thereof, may be part of a personal area network (PAN), a local area network (LAN), a campus area network (CAN), a metropolitan area network (MAP), or any other network type. Also, data communication between any two of the elements in the location-based movie identification system 100 may be direct or indirect. Data communication medium 124 between the base station 126 and the movie identification hub 106 may be any medium through which data can be communicated. For example, the data communication medium 124 may be wired or wireless data connections, and may utilize a virtual private network (VPN), multi-protocol label switching (MPLS), the Internet, or any other data communication media. Wireless communication between the mobile communication device 102 and the base station 126 may utilize any wireless standard for communicating data, such as CDMA (e.g., cdmaOne or CDMA2000), GSM, 3G, 4G, Edge, an over-the-air network, Bluetooth, etc. Any of the transactions occurring in the location-based movie identification system 100 may be performed using secure SSL transactions.

In one example, the location-based movie identification system 100 may utilize the Internet, with the data communication medium 124 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational, and other computer systems that route data and messages. FIG. 1 is intended as an example, and not as an architectural limitation for the different illustrative embodiments.

Figure 2:
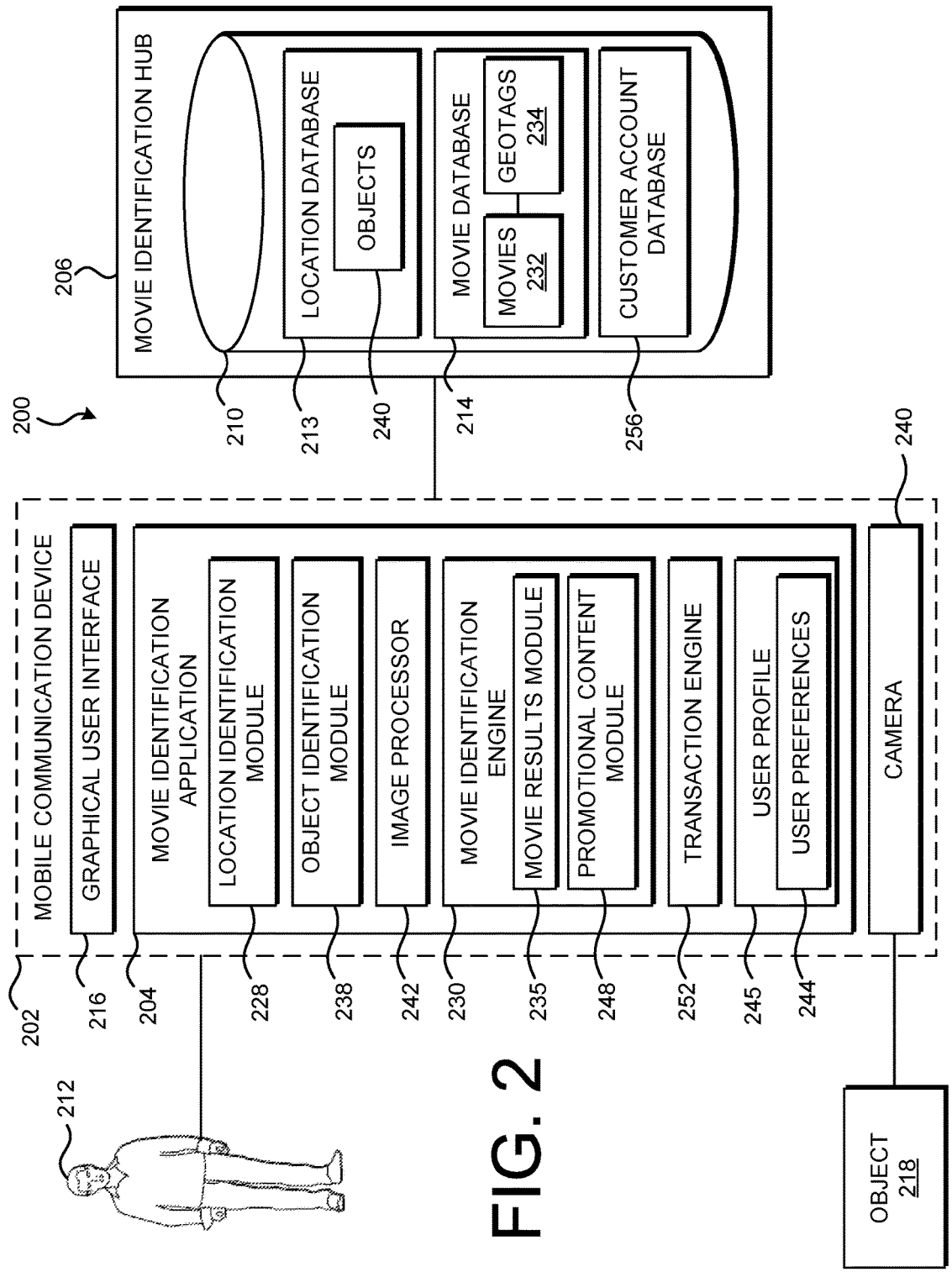
FIG. 2 is a schematic, block diagram of a location-based movie identification system according to an illustrative embodiment.
Figure 3:
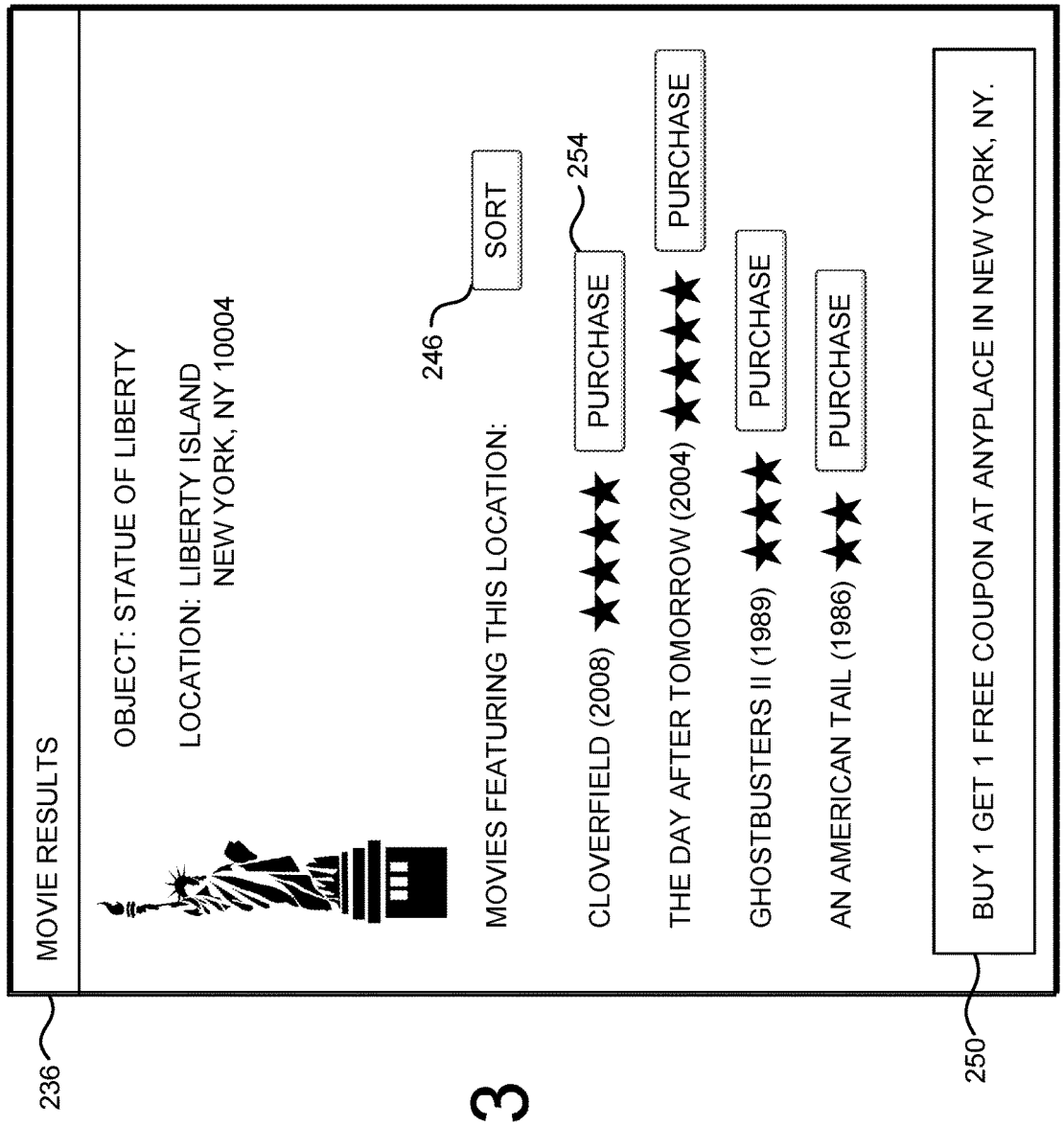
FIG. 3 is a schematic, pictorial representation of a movie results interface displayable to a user according to an illustrative embodiment.

Referring to FIGS. 2 and 3, an illustrative embodiment of the location-based movie identification system 200 includes the movie identification application 204 implemented on the mobile communication device 202, the movie identification hub 206 in communication with the mobile communication device 202, and non-limiting examples of the elements that may be included in the mobile communication device 202 and movie identification hub 206 to implement the location-based movie identification system 200. Elements of FIG. 2 that are analogous to elements in FIG. 1 have been shown by indexing the reference numerals by 100. All or a portion of the elements of the movie identification application 204 or the movie identification hub 206 may be implemented on the mobile communication device 202, a server, such as the server 108 in FIG. 1, a combination of these devices, or any other device that is in communication with the user 212. Thus, for example, the movie identification application 202 may be fully or partially implemented by the mobile communication device 202.

The user 212 may use the movie identification application 204 to retrieve information about movies pertaining to his or her location. The user 212 may activate this retrieval process by, for example, pressing a button instructing the movie identification application 204 to find movies relating to the current location of his or her mobile communication device 202. In one embodiment, the movie identification application 204 includes a location identification module 228 that determines a geographic location of the mobile communication device 202. In one example, the location identification module 228 determines location data, such as global positioning system coordinates, that indicate the location of the mobile communication device 202. Other location-based technologies or services may also be used to determine the location data for the mobile communication device 202, such as WiFi, Cell ID, OTDOA, E-OTD, A-GPS, etc. The location identification module 228 may then access the location database 213 to identify the geographic location of the mobile communication device 202 based on the location data. The location database 213 contains multiple locations, such as zip codes, cities, states, neighborhoods, streets, bodies of water, which are associated with respective location data that is matchable with the location data of the mobile communication device 202. For example, the location data for mobile communication device 202, as determined by the location identification module 228, may be the global positioning system coordinates of 40.689167, −74.044444. These global positioning system coordinates may be stored in the location database 213 and associated with the geographic location of Liberty Island in New York, N.Y. 10004. Thus, when the location identification module 228 uses these global positioning system coordinates to find the geographic location of the mobile communication device 202, the location identification module 228 identifies these global positioning system coordinates in the location database 213 and then identifies the location associated with these coordinate (i.e., Liberty Island), thus determining the geographic location of the mobile communication device 202.

In an alternate embodiment, the location identification module 228 may identify the geographic location of the user 212 based on a user's manual entry of his or her location. For example, the user 212 may manually input his or her current or other location on the mobile communication device 202.

After the location identification module 228 determines the geographic location of the mobile communication device 202, a movie identification engine 230 may then identify a set of movies containing, or otherwise related, to this geographic location by accessing the movie database 214. The movie database 214 may contain multiple entries corresponding to any number of respective movies 232, each of which may be associated with one or more geographic locations relating to the respective movie. For example, each movie 232 in the movie database 214 may have one or more geotags 234 that identify locations that are contained, or otherwise related to, in the movie. The geotags 234 may be any data that indicates a location, such as an address, any political, geographic, or naturally-occurring unit, boundary, or location, global positioning system coordinates, or any combination thereof. By way of example, if the location identification module 228 determines that the mobile communication device 202 is located at Liberty Island, New York, N.Y. 10004, the movie identification engine 230 may search for and identify any geotags 234 that match this geographic location. The movie identification engine 230 may then identify the movies that have the geotags matching the geographic location of the mobile communication device 202 (e.g., Liberty Island).

Once the movies associated with the geographic location of the mobile communication device 202 are identified by the movie identification engine 230, a movie results module 235 displays a set of movie results corresponding to the identified movies on the graphical user interface 216 of the mobile communication device 202. As shown in FIG. 3, the movie results may be displayed on the graphical user interface 216 using a movie results interface 236. The movie results interface 236 lists the movies that relate to the geographic location of the mobile communication device 202, as determined by the location identification module 228. The movie results interface 236 also lists the geographic location of the mobile communication device 202 for the user's reference. In the example of FIG. 3, the geographic location of the mobile communication device 202 is Liberty Island, New York, N.Y. 10004. Additional details regarding the movie results interface 236 are provided below.

In other illustrative embodiments, the location-based movie identification system 200 may use the object 218 located at or near the user 212 to identify movies for presentation to the user 212. The object 218 may be identified by an object identification module 238 in the movie identification application 204. There are numerous ways in which the object identification module 238 may determine the object 218. In one embodiment, the object identification module 238 may identify the object 218 at or near the user 212 based on the geographic location of the mobile communication device 202, as determined by the location identification module 228. In this embodiment, each of the locations in the location database 213 may be associated with one or more objects 240. For example, each of the objects 240 may be linked to, or otherwise associated with, respective locations in the location database 213 at which those objects 240 are located. For example, the object Statue of Liberty may be associated with the location Liberty Island, New York, N.Y. 10004. In identifying the object 218, the object identification module 238 may compare the geographic location of the mobile communication device 202 to locations contained in the location database 213. When the geographic location is found in the location database 213, the one or more objects 240 associated with those locations may be identified as the object 218. In one embodiment, the identification of the object 218 by the object identification module 238, as described above, may be triggered by, or otherwise in response to, the capturing of an image of the object 218 by the camera 240. The object identification module 238 may or may not need to use the image in order to determine any objects contained in the image, depending on the particular embodiment. For example, the object identification module 238 may identify the object 218 in the location database 213 using the geographic location of the mobile communication device 202 and without reference to the image taken by the camera 240.

In another embodiment, the object identification module 238 may identify the object 218 contained in the image captured by the camera 240 using image analysis. In this embodiment, the object identification module 238, in conjunction with an image processor 242, uses image analysis techniques such as object-based image analysis (OPIA), or other techniques or applications capable of recognizing objects within an image. The object identification module 238 may then attempt to find a match between the object recognized using image analysis and the objects 240 in the location database 213 to confirm the accuracy of the image analysis.

In another illustrative embodiment, after the object 218 is identified by the object identification module 238 by analyzing the image captured by the camera 240, the geographic location of the mobile communication device 202 may be determined based on the object 218. For example, if the user 212 captures an image of the Statue of Liberty, the location identification module 228 may determine the location of the mobile communication device 202 by searching for and identifying the geographic location of the Statue of Liberty. In this specific non-limiting example, the location identification module 228 identifies the geographic location of the mobile communication device 202 as being Liberty Island, New York, N.Y. 10004. One example of how the geographic location may be determined based on the object 218 is by the location identification module 228 accessing the location database 213 to search for the object 218 identified by the object identification module 238. The location identification module 228 may, for example, search for and identify the Statue of Liberty as one of the objects 240 in the location database 213, and then identify the location linked to, or associated with, the Statue of Liberty.

In another embodiment, the location identification module 228 may identify the location of the mobile communication device 202, and then the object identification module 238 may validate the object 218 captured in the image using object recognition technology to confirm a match. In particular, after the location identification module 228 identifies the location of the mobile communication device 202 (e.g., Liberty Island, N.Y.), the object identification module 238 may identify, or otherwise recognize, the object 218 (e.g., Statue of Liberty) and validate the location of the object 218 relative to the identified location of the mobile communication device 202. For example, if the location identification module 228 identifies Dallas, Tex. as the location of the mobile communication device 202, but the object identification module 238 identifies the Statue of Liberty as the object 218 contained in the image captured by the camera 240, then the movie identification application 204 may determine that an error has occurred with regard to identifying the object 218 or the location of the mobile communication device 202 since the Statute of Liberty is not located in Dallas, Tex. In another embodiment, the movie identification application 204 may compare the object 218 identified by the object identification module 238 with the location identified by the location identification module 228 to determine a level, or degree, of confidence that the correct object 218 or location has been identified. Also, user proximity to the object 218 may be used to determine a level of confidence that, in turn, determines whether it is necessary to perform an object identification lookup (e.g., look up the object 218 in the location database 213) or object recognition. For example, the closer the identified location is to the object 218, the higher the confidence that the user 212 is looking at, or otherwise near, the object 218. Thus, once the movie identification application 204 determines a proximity between the mobile communication device 202 and a known object, such as one of the objects 240 in the location database 213, the movie identification application 204 may use this proximity to determine a confidence level that indicates, or is otherwise associated with, the likelihood that the mobile communication device 202 is near the object in the location database 213.

In another embodiment, the object identification module 238 may identify the object 218 based on a user's manual entry of the object 218. For example, the user 212 may manually input the name of the object 218 (e.g., Taj Mahal) on the mobile communication device 202.

After either or both of the geographic location of the mobile communication device 202 or the object 218 is identified by the location identification module 228 or the object identification module 238, respectively, the movie identification engine 230 may identify a set of movies for presentation to the user 212 based on either or both of the geographic location or the object 218. As described above, one or more movies may be identified in the movie database 214 using geographic location data, such as geotags 234, that is associated with the movies 232. Each of the movies 232 in the movie database 214 may also be tagged, or otherwise associated with, one or more objects that are contained in, or otherwise related to, the respective movie. Once the object 218 is determined by the object identification module 238, the movie identification engine 230 may search for the object tags in the movie database 214 to find the movies associated with those objects.

The identification of movies by the movie identification engine 230 may also be based on user preferences 244 of the user 212, which are stored in a user profile 245 of the user 212. For example, the user preferences 244 may include a preference for a particular genre of movie, such as comedy or horror, or a particular date range for movies that the user 212 is interested in. When identifying movies, the movie identification engine 230 may take into account these user preferences 244 in addition to the object 218 and/or the geographic location of the mobile communication device 202. By way of non-limiting example, if the object 218 is identified as the Golden Gate Bridge and the user preferences 244 indicate that the user 212 prefers comedies, the movie identification engine 230 will identify movies in the movie database 214 that relate to the Golden Gate Bridge and are comedies.

After the movies associated with the geographic location of the mobile communication device 202 or the object 218 are identified by the movie identification engine 230, a listing of the movie results corresponding to the identified movies may be presented to the user 212 on the graphical user interface 216. These movie results may be listed in the movie results interface 236 shown in FIG. 3, which may also show the object 218 identified by the object identification module 238 or the geographic location identified by the location identification module 228. In the non-limiting example shown in FIG. 3, four movies related to the Statue of Liberty are listed in the movie results interface 236. These movies may be sorted, such as by name, date, rating, or relevance to the object 218, by selecting a sort option 246

In one embodiment, the movie identification engine 230 includes a promotional content module 248 that delivers one or more promotions 250 to the user 212 in conjunction with the movie results delivered by the movie results module 235. The promotion 250 may be an advertisement, coupon, notice, etc. In one embodiment, the promotion 250 selected for display in the movie results interface 236 may be based on the geographic location of the mobile communication device 202 as determined by the location identification module 228, or the object 218 at or near the user 212 as determined by the object identification module 238. Thus, the promotional content module 248 may select promotions that are most relevant to the user 212 based on his or her location. In another embodiment, the promotional content module 248 may identify the promotion 250 based on the movies identified by the movie identification engine 230, such as promotions for memorabilia for a particular movie or for products or services associated with a particular genre of movie.

The movie identification application 204 may also include a transaction engine 252 that conducts a movie purchase transaction for the user 212 when the user 212 selects to purchase one of the movies identified by the movie identification engine 230. As shown in the movie results interface 236 in FIG. 3, the user 212 may select to purchase an identified movie by selecting a purchase option 254 next to a respective movie. After a movie purchase is made, the user 212 may be provided an option to view the movie on the graphical user interface 216. A customer account database 256 at the movie identification hub 206, which may include financial, purchase, or other account-related information for the user 212, may be updated when the user 212 purchases a movie using the transaction engine 252. In another embodiment, the data in the customer account database 256 may be included in the user profile 245.

In another embodiment, the user 212 may be provided with additional options with respect to each movie identified by the movie identification engine 230. For example, the movie results interface 236 may provide the user 212 an option to view a movie synopsis of each of the listed movies, or view detailed rating information (e.g., community, public, etc. ratings).

Figure 4:
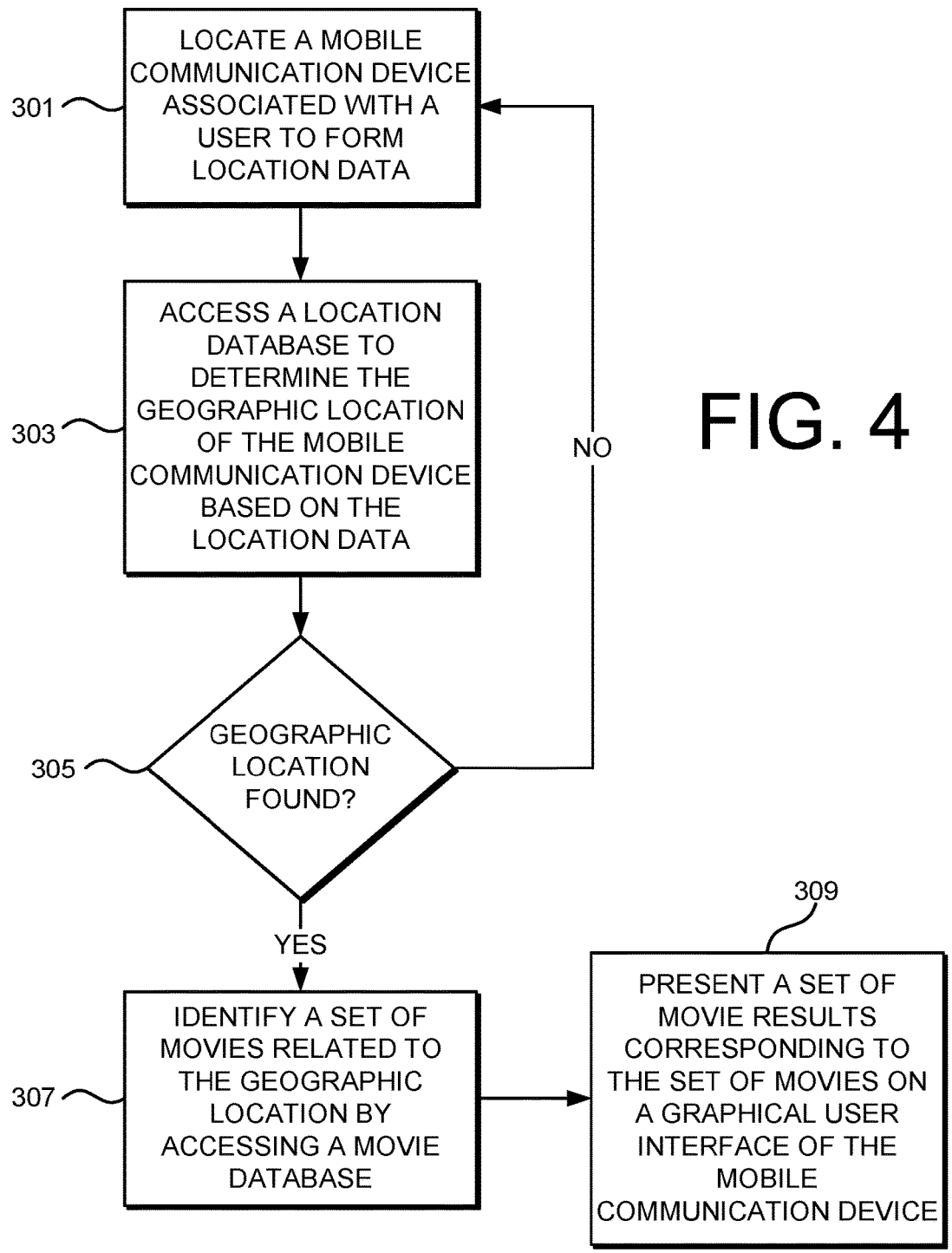
FIG. 4 is a flowchart of a location-based movie identification process according to an illustrative embodiment.

Referring to FIG. 4, an illustrative embodiment of a location-based movie identification process, which may be implemented by the location-based movie identification system 100 or 200 in FIG. 1 or 2, includes locating a mobile communication device associated with a user to form location data (step 301). The process accesses the location database to determine the geographic location of the mobile communication device based on the location data (step 303). The process determines whether the geographic location is found (step 305).

If the process determines that the geographic location is not found, the process returns to step 301. Returning to step 305, if the process determines that the geographic location is found, the process identifies a set of movies related to the geographic location by accessing the movie database (step 307). The process presents a set of movie results corresponding to the set of movies on a graphical user interface of the mobile communication device (step 309).

Figure 5:
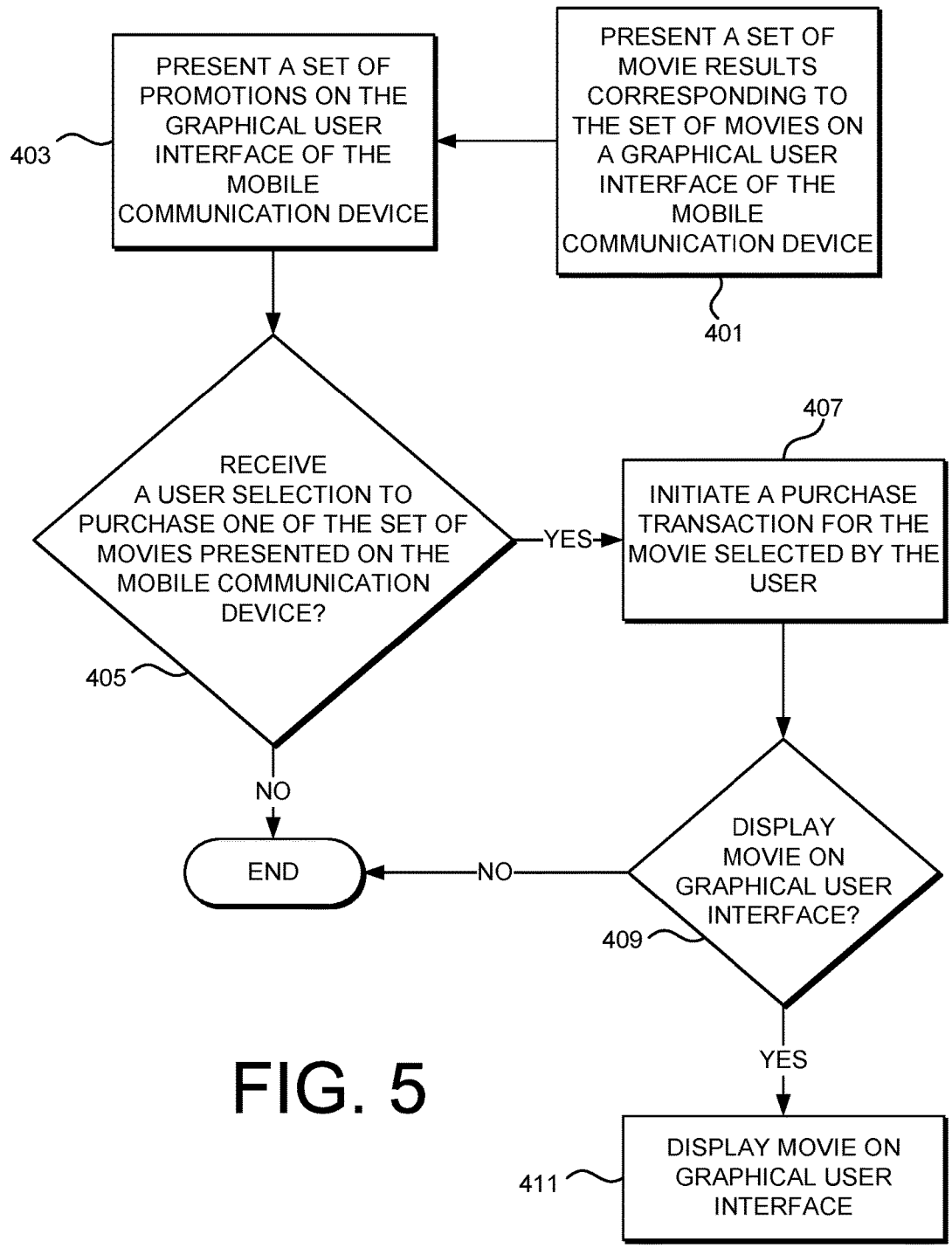
FIG. 5 is a flowchart of a process for managing promotions and transactions in a location-based movie identification system according to an illustrative embodiment.

Referring to FIG. 5, an illustrative embodiment of a process for managing promotions and transactions in a location-based movie identification system, such as the location-based movie identification system 100 or 200 in FIG. 1 or 2, includes presenting a set of movie results corresponding to the set of movies on a graphical user interface of the mobile communication device (step 401). The process presents a set of promotions on the graphical user interface of the mobile communication device (step 403). The process determines whether a user selection to purchase one of the set of movies presented on the mobile communication device is received (step 405). If the process determines that a user selection to purchase one of the set of movies presented on the mobile communication device is not received, the process terminates.

If the process determines that a user selection to purchase one of the set of movies presented on the mobile communication device is received, the process initiates a purchase transaction for the movie selected by the user (step 407). The process determines whether to display the movie on the graphical user interface, such as by user selection (step 409). If the process determines not to display the movie on the graphical user interface, the process terminates. If the process determines to display the movie on the graphical user interface, the process displays the movie on the graphical user interface (step 411).

Figure 6:
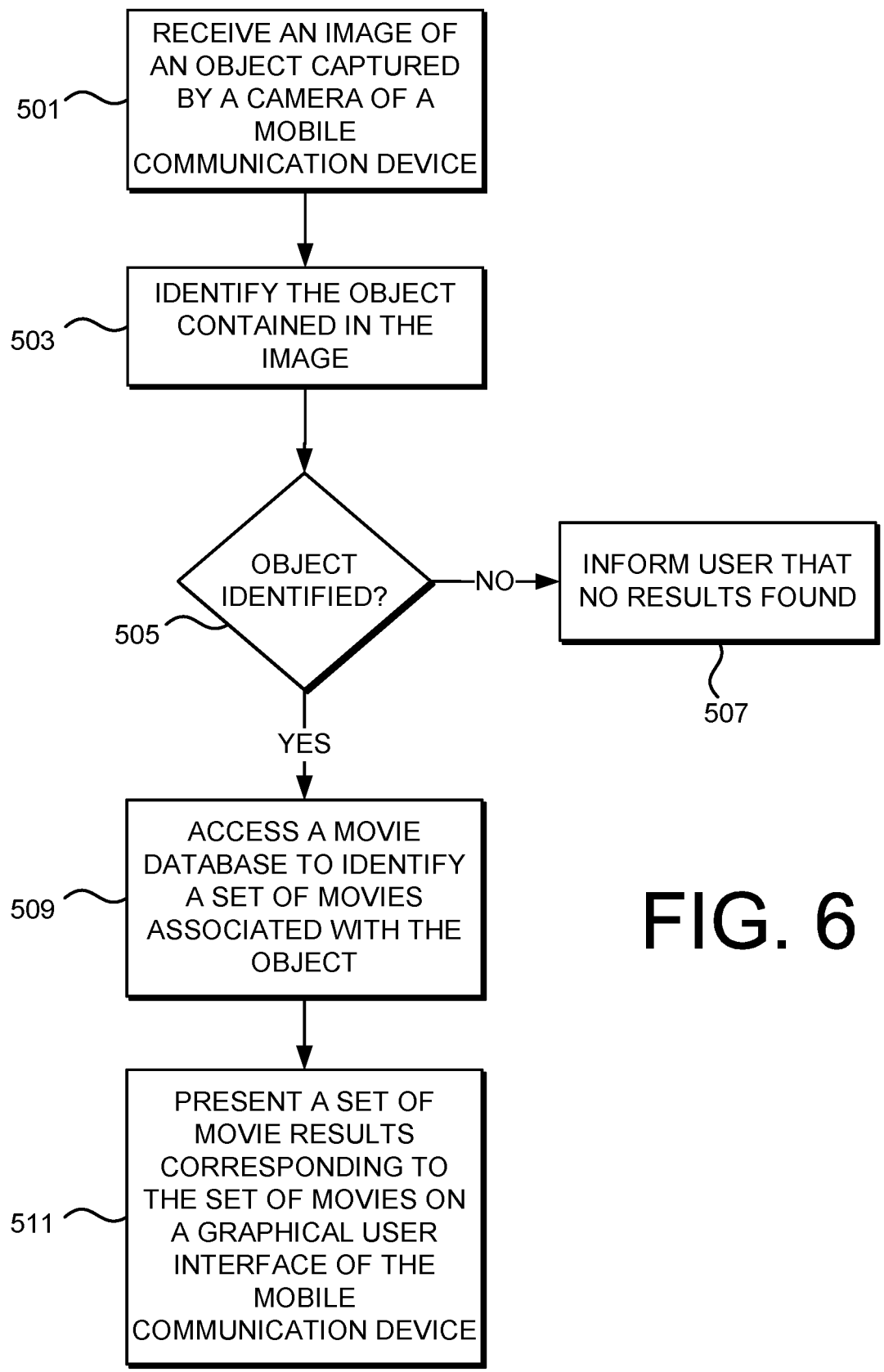
FIG. 6 is a flowchart of a location-based movie identification process according to another illustrative embodiment.

Referring to FIG. 6, an illustrative embodiment of a location-based movie identification process, which may be implemented by the location-based movie identification system 100 or 200 in FIG. 1 or 2, includes receiving an image of an object captured by a camera of a mobile communication device (step 501). The process identifies the object contained in the image (step 503). The process determines whether the object is identified (step 505). If the process determines that the object is not identified, the process informs the user that no results are found (step 507).

If the process determines that the object is identified, the process accesses a movie database to identify a set of movies associated with the object (step 509). The process presents a set of movie results corresponding to the set of movies on a graphical user interface of the mobile communication device (step 511).

Figure 7:
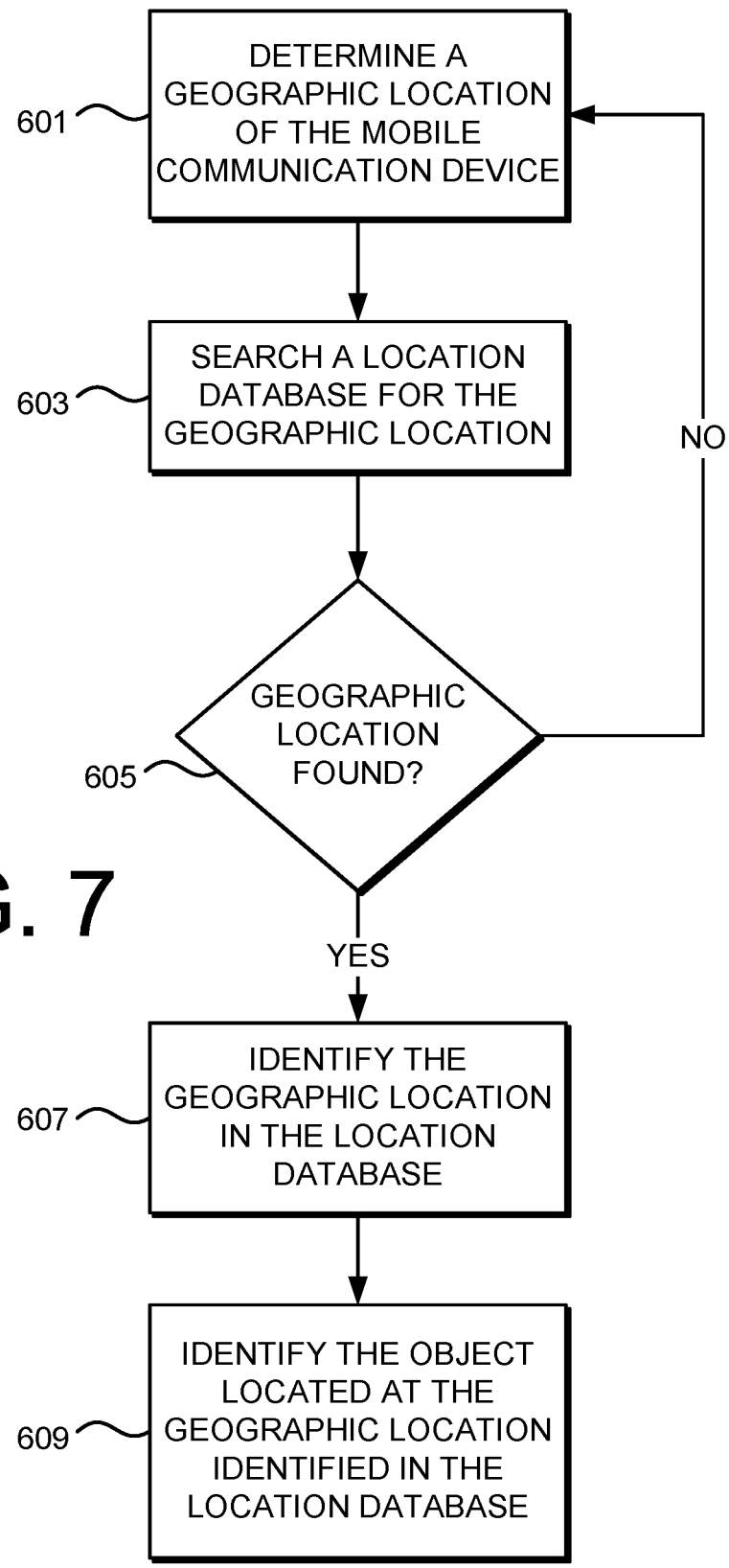
FIG. 7 is a flowchart of an illustrative embodiment of a sub-process for the step of identifying an object that is shown in FIG. 6.

Referring to FIG. 7, an illustrative embodiment of the step 503 identifying the object contained in the image shown in FIG. 6 includes determining a geographic location of the mobile communication device (step 601). The process searches a location database for the geographic location (step 603). The process determines whether a geographic location is found (step 605). If the process determines that the geographic location is not found, the process returns to step 601.

If the process determines that the geographic location is found, the process identifies a geographic location in the location database (step 607). The process identifies the object located at the geographic location identified in the location database (step 609).

Figure 8:
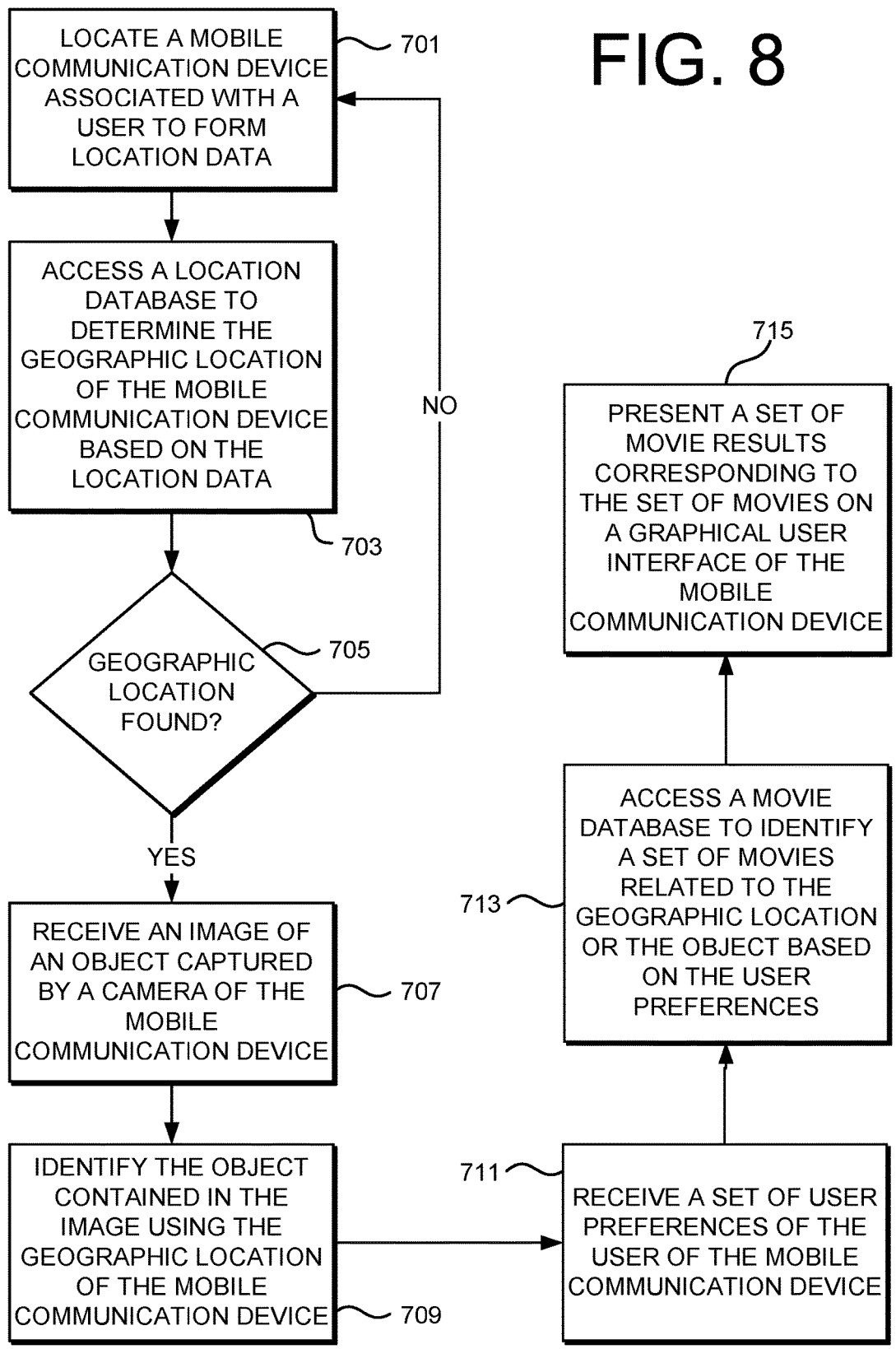
FIG. 8 is a flowchart of a location-based movie identification process according to another illustrative embodiment.

Referring to FIG. 8, an illustrative embodiment of a location-based movie identification process, which may be implemented by the location-based movie identification system 100 or 200 in FIG. 1 or 2, includes locating a mobile communication device associated with a user to form location data (step 701). The process accesses a location database to determine the geographic location of the mobile communication device based on the location data (step 703). The process determines whether the geographic location is found (step 705). If the process determines that the geographic location is not found, the process returns to step 701.

If the process determines that the geographic location is found, the process receives an image of an object captured by a camera of the mobile communication device (step 707). The process identifies the object contained in the image using the geographic location of the mobile communication device (step 709). The process receives a set of user preferences of the user of the mobile communication device (step 711).

The process accesses a movie database to identify a set of movies related to the geographic location or the object based on the user preferences (step 713). The process presents a set of movie results corresponding to the set of movies on the graphical user interface of the mobile communication device (step 715).

The flowcharts and block diagrams in the different depicted embodiments illustrate the architecture, functionality, and operation of some possible implementations of apparatus, methods and computer program products. In this regard, each block in the flowchart or block diagrams may represent a module, segment, or portion of code, which comprises one or more executable instructions for implementing the specified function or functions. In some alternative implementations, the function or functions noted in the block may occur out of the order noted in the Figures. For example, in some cases, two blocks shown in succession may be executed substantially concurrently, or the blocks may sometimes be executed in the reverse order, depending upon the functionality involved.

Figure 9:
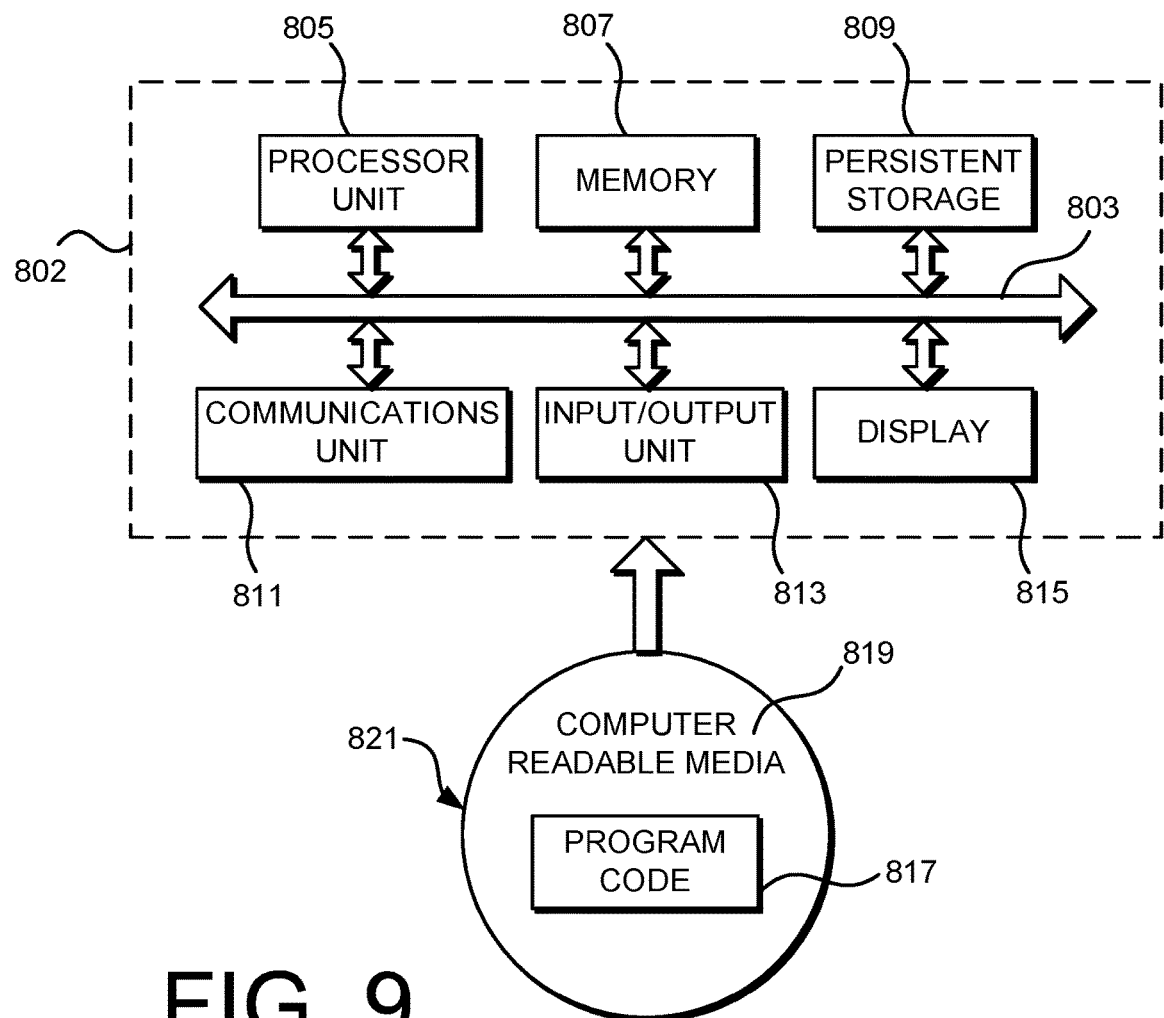
FIG. 9 is a schematic, block diagram of a data processing system in which the illustrative embodiments may be implemented.

Referring to FIG. 9, a block diagram of a computing device 802 is shown in which illustrative embodiments may be implemented. The computing device 802 may be the mobile communication device 102 or 202 described in FIG. 1 or 2, respectively. The computing device 802 may be the computing device on which the movie identification application 104 or 204 in FIG. 1 or 2 is implemented. Computer-usable program code or instructions implementing the processes used in the illustrative embodiments may be located on the computing device 802. The computing device 802 includes a communications fabric 803, which provides communications between a processor unit 805, a memory 807, a persistent storage 809, a communications unit 811, an input/output (I/O) unit 813, and a display 815.

The processor unit 805 serves to execute instructions for software that may be loaded into the memory 807. The processor unit 805 may be a set of one or more processors or may be a multi-processor core, depending on the particular implementation. Further, the processor unit 805 may be implemented using one or more heterogeneous processor systems in which a main processor is present with secondary processors on a single chip. As another illustrative example, the processor unit 805 may be a symmetric multi-processor system containing multiple processors of the same type.

The memory 807, in these examples, may be, for example, a random access memory or any other suitable volatile or non-volatile storage device. The persistent storage 809 may take various forms depending on the particular implementation. For example, the persistent storage 809 may contain one or more components or devices. For example, the persistent storage 809 may be a hard drive, a flash memory, a rewritable optical disk, a rewritable magnetic tape, or some combination of the above. The media used by the persistent storage 809 also may be removable. For example, a removable hard drive may be used for the persistent storage 809.

The communications unit 811, in these examples, provides for communications with other data processing systems or communication devices. In these examples, the communications unit 811 may be a network interface card. The communications unit 811 may provide communications through the use of either or both physical and wireless communication links.

The input/output unit 813 allows for the input and output of data with other devices that may be connected to the computing device 802. For example, the input/output unit 813 may provide a connection for user input through a keyboard and mouse. Further, the input/output unit 813 may send output to a processing device. In the case in which the computing device 802 is a cellular phone, the input/output unit 813 may also allow devices to be connected to the cellular phone, such as microphones, headsets, and controllers. The display 815 provides a mechanism to display information to a user, such as a graphical user interface. The display 815 may be used to display the text messages described in the illustrative embodiments.

Instructions for the operating system and applications or programs are located on the persistent storage 809. These instructions may be loaded into the memory 807 for execution by the processor unit 805. The processes of the different embodiments may be performed by the processor unit 805 using computer-implemented instructions, which may be located in a memory, such as the memory 807. These instructions are referred to as program code, computer-usable program code, or computer-readable program code that may be read and executed by a processor in the processor unit 805. The program code in the different embodiments may be embodied on different physical or tangible computer-readable media, such as the memory 807 or the persistent storage 809.

Program code 817 is located in a functional form on a computer-readable media 819 and may be loaded onto or transferred to the computing device 802 for execution by the processor unit 805. The program code 817 and the computer-readable media 819 form computer program product 821 in these examples. In one embodiment, the computer program product 821 is the movie identification application 104 or 204 described in FIG. 1 or 2, respectively. In this embodiment, the program code 817 may include computer-usable program code capable of locating a mobile communication device associated with a user to form location data, accessing a location database to determine a geographic location of the mobile communication device based on the location data, and identifying a set of movies related to the geographic location by accessing a movie database. Each of the set of movies in the movie database is associated with one or more respective geographic locations. The program code 817 may also include computer-usable program code capable of presenting a set of movie results corresponding to the set of movies on a graphical user interface of the mobile communication device.

In another embodiment, the program code 817 may include computer-usable program code capable of receiving an image captured by a camera of a mobile communication device. The mobile communication device is associated with a user, and the image at least partially contains an object. The program code 817 may also include computer-usable program code capable of identifying the object contained in the image and accessing a movie database to identify a set of movies associated with the object. The movie database includes a plurality of movies associated with a respective set of objects. The program code 817 may also include computer-usable program code capable of presenting a set of movie results corresponding to the set of movies on a graphical user interface of the mobile communication device. Any combination of the above-mentioned computer-usable program code may be implemented in the program code 817, and any functions of the illustrative embodiments may be implemented in the program code 817.

In one example, the computer-readable media 819 may be in a tangible form, such as, for example, an optical or magnetic disc that is inserted or placed into a drive or other device that is part of the persistent storage 809 for transfer onto a storage device, such as a hard drive that is part of the persistent storage 809. In a tangible form, the computer-readable media 819 also may take the form of a persistent storage, such as a hard drive or a flash memory that is connected to the computing device 802. The tangible form of the computer-readable media 819 is also referred to as computer recordable storage media.

Alternatively, the program code 817 may be transferred to the computing device 802 from the computer-readable media 819 through a communication link to the communications unit 811 or through a connection to the input/output unit 813. The communication link or the connection may be physical or wireless in the illustrative examples. The computer-readable media 819 also may take the form of non-tangible media, such as communication links or wireless transmissions containing the program code 817.

The different components illustrated for the computing device 802 are not meant to provide architectural limitations to the manner in which different embodiments may be implemented. The different illustrative embodiments may be implemented in a data processing system including components in addition to or in place of those illustrated for computing device 802. Other components shown in FIG. 9 can be varied from the illustrative examples shown.

As one example, a storage device in the computing device 802 is any hardware apparatus that may store data. The memory 807, the persistent storage 809, and the computer-readable media 819 are examples of storage devices in a tangible form.

In another example, a bus system may be used to implement the communications fabric 803 and may be comprised of one or more buses, such as a system bus or an input/output bus. Of course, the bus system may be implemented using any suitable type of architecture that provides for a transfer of data between different components or devices attached to the bus system. Additionally, the communications unit 811 may include one or more devices used to transmit and receive data, such as a modem or a network adapter. Further, a memory may be, for example, the memory 807 or a cache such as found in an interface and memory controller hub that may be present in the communications fabric 803.

The principles of the present invention can take the form of an entirely hardware embodiment, an entirely software embodiment, or an embodiment containing both hardware and software elements. In one embodiment, the invention is implemented in software, which includes but is not limited to, firmware, resident software, microcode, and other computer readable code.

Furthermore, the principles of the present invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The previous detailed description is of a small number of embodiments for implementing the invention and is not intended to be limiting in scope. One of skill in this art will immediately envisage the methods and variations used to implement this invention in other areas than those described in detail. The following claims set forth a number of the embodiments of the invention disclosed with greater particularity.

What is claimed is:

1. A method, comprising:
   forming location data of a mobile communication device, by the mobile communication device;
   accessing a first database to determine a geographic location of the mobile communication device based on the location data, by the mobile communication device;
   identifying, by the mobile communication device, an object partially contained in an image captured by a camera using the geographic location of the mobile communication device; and
   identifying, by the mobile communication device, a set of movies that include the object partially contained in the image captured by the camera and related to the geographic location by accessing a second database, each of the set of movies in the second database associated with one or more respective geographic locations, wherein
   the mobile communication device determines that the object is partially contained in the image.

2. The method of claim 1, further comprising:
   receiving the captured image from a camera of the mobile communication device, the image partially containing the object.

3. The method of claim 2, further comprising at least one of:
   receiving the image captured by the camera of the mobile communication device, the image partially containing the object;
   identifying a direction at which the camera of the mobile communication device is pointed when the image is captured; and
   identifying the object partially contained in the image using the geographic location of the mobile communication device and the direction of the camera.

4. The method of claim 1, wherein
   the first database comprises a plurality of locations and a plurality of objects, each of the plurality of objects corresponding to at least one of the plurality of locations,
   accessing the first database to determine the geographic location of the mobile communication device comprises accessing the first database to identify an object at or near the mobile communication device based on the geographic location of the mobile communication device, and
   identifying the set of movies related to the geographic location comprises identifying the set of movies related to the object at or near the mobile communication device.

5. The method of claim 1, wherein the location data comprises global positioning system coordinates associated with a position of the mobile communication device.

6. The method of claim 1, further comprising:
   receiving a set of user preferences from a user, the set of user preferences comprising movie preferences of the user, wherein
   identifying the set of movies comprises identifying the set of movies using the set of user preferences.

7. The method of claim 1, further comprising:
receiving a user selection to purchase at least one of the set of movies presented on the mobile communication device; and
initiating a purchase transaction for the at least one movie selected by a user.

8. The method of claim 1, further comprising:
presenting a set of movie results corresponding to the set of movies on a graphical user interface of the mobile communication device, wherein
presenting the set of movie results corresponding to the set of movies on the graphical user interface comprises presenting a set of promotions on the graphical user interface of the mobile communication device, the set of promotions associated with at least one of the set of movies or the geographic location of the mobile communication device.

9. A system, comprising:
a movie identification application at least partially implemented by a mobile communication device, the movie identification application comprising:
 a movie identification engine configured to identify a set of movies associated with a geographic location, the movie identification engine comprising a module including movie results, and
 an object identification module configured to recognize an object partially contained in an image captured by a camera and determine that the object is partially contained in the image, wherein
the movie identification engine is further configured to identify a set of movies related to the movie results that include the object partially contained in the image captured by the camera.

10. The system of claim 9, further comprising:
a location identification module configured to determine the geographic location of the mobile communication device and a first database configured to store a plurality of locations, wherein
the location identification module is further configured to access the first database to determine the geographic location of the mobile communication device using location data associated with the mobile communication device.

11. The system of claim 9, further comprising:
a second database comprising a plurality of movies, each of the plurality of movies associated with a respective set of geotags, wherein
the movie identification engine is further configured to access the second database to identify the set of movies using the geotags.

12. The system of claim 9, further comprising:
a mobile communication device comprising the camera configured to capture the image partially containing the object.

13. The system of claim 9, further comprising:
a first database comprising a plurality of locations and a plurality of objects, each of the plurality of objects corresponding to at least one of the plurality of locations.

14. The system of claim 9, further comprising:
a mobile communication device comprising the camera configured to capture the image partially containing the object, wherein
the movie identification application further comprises an object identification module is configured to identify the object using the geographic location of mobile communication device.

15. The system of claim 9, further comprising:
a transaction engine configured to conduct a movie purchase transaction for a user of the mobile communication device when the user selects to purchase one of the set of movies.

* * * * *